US006331596B1

(12) United States Patent
Ramesh et al.

(10) Patent No.: US 6,331,596 B1
(45) Date of Patent: Dec. 18, 2001

(54) METHOD OF PREPARING CARBAMATE-FUNCTIONAL POLYMERS

(75) Inventors: Swaminathan Ramesh, Canton; Marvin L. Green, Brighton, both of MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/340,632

(22) Filed: Jun. 28, 1999

(51) Int. Cl.$^7$ ............................... C08F 8/30; C08G 85/00
(52) U.S. Cl. ..................... 525/329.9; 525/360; 525/370; 525/374; 526/100; 526/135; 526/192; 526/221; 526/320
(58) Field of Search ................. 525/329.9, 374, 525/370, 360; 526/100, 135, 192, 227, 320

(56) References Cited

U.S. PATENT DOCUMENTS

| | | | |
|---|---|---|---|
| 5,412,049 | * 5/1995 | Argyropoulos et al. | 526/320 |
| 5,639,828 | * 6/1997 | Briggs et al. | 525/208 |
| 5,665,433 | * 9/1997 | Moussa et al. | 427/377 |
| 5,709,950 | * 1/1998 | Burgman et al. | 525/154 |
| 5,976,615 | * 11/1999 | Menovcik et al. | 525/374 |
| 6,150,465 | * 11/2000 | Harris et al. | 525/163 |

OTHER PUBLICATIONS

Adams et al., "Esters of Carbamic Acid", Chem. Revs., 65, pp. 567 and 570–571 (1965).*

* cited by examiner

Primary Examiner—Donald R. Wilson

(57) ABSTRACT

A method of preparing a carbamate-functional polymer comprising the steps of providing a hydroxy-functional polymer and reacting a carbamate compound with the hydroxy-functional polymer in the presence of a transcarbamation catalyst, thereby forming a carbamate-functional polymer. The transcarbamation catalyst may be Bi(III) compounds, Zr(IV) compounds, or mixtures of these.

21 Claims, No Drawings

METHOD OF PREPARING CARBAMATE-FUNCTIONAL POLYMERS

FIELD OF THE INVENTION

The present invention relates to a method for preparing carbamate-functional polymers, and more particularly to a method of transesterifying a hydroxy-functional polymer with a carbamate compound in the presence of a Bi(III) or Zr(IV) catalyst.

BACKGROUND AND SUMMARY OF THE INVENTION

Polymers and oligomers having carbamate functional groups have been used in a variety of curable coating compositions. Carbamate-functional polymers offer many advantages in these coating compositions, such as resistance to environmental etch and resistance to scratching and marring. One kind of carbamate-functional polymer described in the art is addition-type polymers. One known method for preparing a carbamate-functional polymer is to transesterify a hydroxy-functional acrylic polymer with a carbamate compound. Tin compounds, specifically tin oxides, are typically used for the transesterification or transcarbamation of hydroxy-functional acrylate polymers with carbamate compounds, such as alkyl carbamates. "Transcarbamation" as used in this application is defined as a process where a carbamate group is put on a monomer or polymer at a hydroxyl site.

Tin compounds used as transesterification catalysts, however, are known in the art to cause yellowing and to be deleterious to weathering in humid conditions. Another problem with the use of tin compounds is an undesired increase in the molecular weight of the polymer undergoing transesterification. This is thought to be a result of side reactions that occur as the transesterification reaction continues to run. Additionally, tin catalysts cannot be used for transesterification reactions when there is any acid present in the reaction medium. It would thus be desirable to find other catalysts with improved properties that may be employed for the transesterification or transcarbamation of hydroxy-functional acrylic polymers with carbamate compounds.

The present invention provides a method for preparing carbamate-functional polymers including providing a hydroxy-functional polymer and then reacting a carbamate compound with the hydroxy-functional polymer in the presence of a transcarbamation catalyst. A carbamate-functional polymer is thus formed. The transcarbamation catalyst may be a Bi(III) compound, Zr(IV) compound, or mixtures of these.

The present invention also provides a method for preparing carbamate-functional polymers including polymerizing in a reaction vessel at a temperature below about 150° C. at least one hydroxy-functional monomer in the presence of a transcarbamation catalyst and a carbamate compound having 1 to 4 carbon atoms. An at least partially transcarbamated polymer is formed. The transcarbamation catalyst may be a Bi(III) compound, Zr(IV) compound, or mixtures of these.

The present invention further provides a method for preparing carbamate-functional acrylic polymers including polymerizing in a reaction vessel at a temperature below about 150° C. at least one hydroxy-functional monomer in the presence of a transcarbamation catalyst and a carbamate compound having 1 to 4 carbon atoms. An at least partially transcarbamated polymer is formed. The transcarbamation catalyst may be a Bi(III) compound, Zr(IV) compound, or mixtures of these.

The present invention also provides a carbamate-functional polymer prepared by reacting a hydroxy-functional polymer with a carbamate compound in the presence of a transcarbamation catalyst. The transcarbamation catalyst may be Bi(III) compounds, Zr(IV) compounds or mixtures of these.

DETAILED DESCRIPTION

Hydroxy-containing acrylic monomers useful for preparing hydroxy-functional acrylic polymers of the present invention may be, but are not limited to, hydroxyethyl acrylate, hydroxyethyl methacrylate, hydroxypropyl acrylate, hydroxypropyl methacrylate, hydroxybutyl acrylates, hydroxybutyl methacrylates, and combinations of these. The polymer may be prepared by reacting at least one hydroxy-containing acrylic monomer with one or more other addition-polymerizable monomers. Suitable monomers for copolymerization with acrylic monomers are known in the art. They include, but are not limited to, alkyl esters of acrylic or methacrylic acid, e.g., ethyl acrylate, butyl acrylate, 2-ethylhexyl acrylate, butyl methacrylate, isodecyl methacrylate, and the like; and vinyl monomers such as styrenic monomers (e.g., styrene, t-butyl styrene), vinyl toluene, and the like. Other examples include methyl acrylate, methyl methacrylate, propyl acrylate, propyl methacrylate, isopropyl acrylate, isopropyl methacrylate, isobutyl acrylate, isobutyl methacrylate, pentyl acrylate, pentyl methacrylate, isoamyl acrylate, isoamyl methacrylate, hexyl acrylate, hexyl methacrylate, cyclohexyl acrylate, cyclohexyl methacrylate, octyl acrylate, octyl methacrylate, 3,5,5-trimethylhexyl acrylate, 3,5,5-trimethylhexyl methacrylate, decyl acrylate, decyl methacrylate, dodecyl acrylate, dodecyl methacrylate, hexadecyl acrylate, hexadecyl methacrylate, octadecyl acrylate, octadecyl methacrylate, octadecenyl acrylate, octadecenyl methacrylate as well as the esters of maleic, fumaric, crotonic, isocrotonic, vinylacetic and itaconic acids.

Suitable free-radical initiators for the addition polymerization reaction of the present invention include organic peroxides, for example dibenzyl peroxide, dicumyl peroxide, cumene hydroperoxide, di-tert-butyl peroxide, tert butyl hydroperoxide, 2,2-di-tert-butylperoxybutane, tert-amyl perbenzoate, 1,3-bis(tert-butylperoxyisopropyl) benzene, diisopropylbenzene monohydroperoxide and diacyl peroxides, for example diacetyl peroxide, peroxyketals, for example 2,2-di(tert-amylperoxy)propane and ethyl 3,3-di(tert-amylperoxy)butyrate, thermolabile highly substituted ethane derivatives, for example those based on silyl-substituted ethane derivatives, and Azo compounds, for example azo-bis-cyclohexanenitrile and other compounds sold as Vazo® compounds by DuPont.

Carbamate-functional polyester polymers may also be prepared according to the methods of the present invention. The methods of making polyester resins are well-known. For example, the polyester polymer may be prepared from a hydroxyacid, such as citric acid, or from reacting a diacid with a dialcohol.

The carbamate compound employed in the present invention may be any compound having a carbamate group capable of undergoing a transesterification or transcarbamation reaction with a hydroxyl group of a hydroxy-polyacrylate polymer. These may include, for example, methyl carbamate, butyl carbamate, propyl carbamate, ethyl carbamate, 2-ethylhexyl carbamate, cyclohexyl carbamate, phenyl carbamate, hydroxypropyl carbamate, hydroxyethyl carbamate and combinations of these.

The transesterification or transcarbamation catalyst employed in the present invention may be a Bi(III) compound, Zr(IV) compound, or mixtures of these. The transcarbamation reaction occurs between the hydroxy group on the acrylic polymer and the carbamate group. The Bi(III) compound may be, without limitation, bismuth (III) oxide ($Bi_2O_3$) or bismuth (III) tri(2-ethylhexanoate) (Bi ($C_7H_{15}COO$)$_3$). The catalyst employed in the present invention may also be an organo bismuth oxide or the reaction product of a bismuth oxide halide with an alcohol or acid compound. Examples of alcohol compounds may be, but are not limited to, 2-ethylhexanol, neodecanol, and stearyl alcohol, while examples of acid compounds are 2-ethylhexanoic acid, neodecanoic acid, and stearic acid.

The Bi(III) catalyst will catalyze the transesterification reaction even in an acidic environment, such as, for example, with the bismuth (III) tri(2-ethylhexanoate) catalyst, which contains about 30% 2-ethylhexanoic acid. This is in contrast to a tin catalyst, which is poisoned by the presence of any acid group, and therefore cannot catalyze the transesterification reaction.

The zirconium catalyst may be any Zr(IV) compound, including, but not limited to, zirconium alkoxides, zirconium alkanoates, and zirconium dihalide oxides. Examples of these may be zirconium chelate, zirconium dichloride oxide, zirconium 2-ethylhexanoate, zirconium n-butoxide, zirconium naphthenate, and zirconium octoate. A preferred embodiment Zr(IV) catalyst is a zirconium chelate, such as K-Kat XC-6212® (King Industries).

According to the present method, the transesterification catalyst can be added after completion of the addition polymerization reaction. Alternatively, a portion or amount of the transesterification catalyst and carbamate compound may be added during the polymerization of the monomers. The temperature of this reaction, however, cannot exceed 150° C., as the carbamate compound would decompose at increased temperatures. This reaction increases the solids content of the resin and allows part of the transcarbamation of the resin to be completed by the time the initial monomer conversion is finished. The carbamate-functional polymer may further be prepared by feeding or adding to the reaction vessel the monomer, transcarbamation catalyst, and carbamate compound simultaneously, or alternatively, by first charging the transcarbamation catalyst and carbamate compound and then feeding in the monomer.

The polymerization and the transesterification reactions are preferably carried out in the absence of oxygen, for example in a nitrogen atmosphere. The nitrogen blanket may be removed as the temperature begins to approach reflux (around 100–130° C.) as long as the nitrogen is resumed once reflex is lost. The reaction vessel is equipped with suitable stirring, heating and cooling equipment as well as with a reflux condenser which condenses volatile constituents, for example solvent and alcohol by-product from the transesterification reaction. A trap or some other device may also be included for removing the alcohol by-product. The polymerization reaction may be carried out at temperatures of 100–140° C., preferably 115–140° C.

The polymerization and transesterification reactions are carried out in an organic solvent or mixture of organic solvents that is inert toward the monomers used. Examples of suitable solvents include aromatic hydrocarbons, for example toluene, xylene, mesitylene, 2-, 3-, or 4-ethyltoluene, Solvent Naphtha®, heavy naphtha, various types of Solvesso®, various types of Shellsol®, and Deasol®, as well as higher-boiling aliphatic and cycloaliphatic hydrocarbons, for example various white spirits, mineral turpentine, tetralin and decalin, and also ketones, individually or as mixtures.

The polymer prepared according to the present invention can be used in a curable coating composition. Such a composition is cured by a reaction of the carbamate-functional polymer with a curing agent that is a compound having a plurality of functional groups that are reactive with the carbamate groups on the polymer. Such reactive groups include active methylol, methylalkoxy or butylalkoxy groups on aminoplast crosslinking agents. Examples of suitable curing agent compounds include, without limitation, melamine formaldehyde resins, including monomeric or polymeric melamine resins and partially or fully alkylated melamine resins, and urea resins (e.g., methylol ureas such as urea formaldehyde resin, and alkoxy ureas such as butylated urea formaldehyde resin).

A solvent may optionally be utilized in a curable coating composition. Although the curable composition may be employed, for example, in the form of substantially solid powder, or a dispersion, it is often desirable that the composition is in a substantially liquid state, which can be accomplished with the use of a solvent. This solvent should act as a solvent with respect to both the carbamate-functional polymer as well as the curing agent. In general, depending on the solubility characteristics of the components, the solvent can be any organic solvent and/or water. In one preferred embodiment, the solvent is a polar organic solvent. More preferably, the solvent is a polar aliphatic solvent or polar aromatic solvent. Still more preferably, the solvent is a ketone, ester, acetate, aprotic amide, aprotic sulfoxide, or aprotic amine. Examples of useful solvents include methyl ethyl ketone, methyl isobutyl ketone, n-amyl acetate, ethylene glycol butyl ether acetate, propylene glycol monomethyl ether acetate, xylene, N-methylpyrrolidone, or blends of aromatic hydrocarbons. In another preferred embodiment, the solvent is water or a mixture of water with small amounts of co-solvents.

Curable coating compositions may include a catalyst to enhance the cure reaction. For example, when aminoplast compounds, especially monomeric melamines, are used as the curing agent, a strong acid catalyst may be utilized to enhance the cure reaction. Such catalysts are well-known in the art and include, for example, p-toluenesulfonic acid, dinonylnaphthalene disulfonic acid, dodecylbenzene-sulfonic acid, phenyl acid phosphate, monobutyl maleate, butyl phosphate, and hydroxy phosphate ester. Strong acid catalysts are often blocked, e.g. with an amine. Other catalysts that may be useful in curable coating compositions include Lewis acids and zinc salts.

The solvent present in the coating composition is preferably in an amount of from about 0.01 weight percent to about 99 weight percent, preferably from about 10 weight percent to about 60 weight percent, and more preferably from about 30 weight percent to about 50 weight percent.

Any additional agents used, for example, surfactants, fillers, stabilizers, wetting agents, dispersing agents, adhesion promoters, UV absorbers, hindered amine light stabilizers (HALS), etc. may be incorporated into the coating composition. While the agents are well-known in the prior art, the amount used must be controlled to avoid adversely affecting the coating characteristics.

Coating compositions can be coated by any of a number of techniques well-known in the art. These include, for example, spray coating, dip coating, roll coating, curtain coating, and the like. For automotive body panels, spray coating is preferred.

A coating composition utilizing a polymer prepared according to the invention is preferably utilized in a high-gloss coating and/or as the clearcoat of a composite color-plus-clear coating. High-gloss coatings as used herein are coatings having a 20° gloss (ASTM D523-89) or a DOI (ASTM E430-91) of at least 80. In particular, according to the present invention, the use of bismuth or zirconium catalysts in the transesterification of acrylic polymers enhances the intercoat repair adhesion in clearcoat systems.

When the coating composition is used as a high-gloss pigmented paint coating, the pigment may be any organic or inorganic compounds or colored materials, metallic, or other inorganic flake materials such as mica or aluminum flake, and other materials of the kind that the art normally names as pigments. Pigments are usually used in the composition in an amount of about 1% to about 4% for a clearcoat composition, and about 5% to about 60% for a basecoat composition, both based on the total solid weight of the composition.

When the coating composition is used as the clearcoat of a composite color-plus-clear coating, the pigmented basecoat composition may be any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures.

Basecoat polymers may be self-crosslinkable or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the crosslinking agents, however they generally range between 93° C. and 177° C., preferably between 115° C. and 150° C., and more preferably at temperatures between 115° and 138° C. for a blocked acid catalyzed system. For an unblocked acid catalyzed system, the cure temperature is preferably between 82° C. and 125° C. The curing time will vary depending on the particular components used, and physical parameters such as the thickness of the layers, however, typical curing times range from about 15 to about 60 minutes, and preferably about 15–25 minutes for blocked acid catalyzed systems and about 10–20 minutes for unblocked acid catalyzed systems.

The invention is further described in the following examples. The examples are merely illustrative and do not in any way limit the scope of the invention as described and claimed. All parts are by weight unless specified.

EXAMPLES

Example 1

Carbamate-Functional Acrylic Polymer

A three-necked, 5-liter, round-bottom flask was fitted with an agitator at the center neck and a Claisson adapter at one of the side necks. A thermocouple and a nitrogen purge were fed through the center of the Claisson adapter and a monomer feed line was fed through the side neck of the adapter. The second side neck of the flask was fitted with a column packed with ceramic saddles, a convertible liquid/liquid continuous extractor, and a water-cooled condenser. The liquid/liquid extractor contained 100 g of deionized water to extract the methanol from the methanol/aromatic solvent distillate mixture.

238.5 g of urethane-grade mixed aromatics solvent (Solvesso® 100), 208.9 g of methyl carbamate, and 0.9 g of bismuth (III) tri(2-ethylhexanoate) were charged to the flask. The mixture was agitated and heated to 140° C. with a nitrogen purge. As distillate started to condense to the liquid/liquid extractor, the nitrogen purge was discontinued.

329.4 g of hydroxyethyl methacrylate, 461.5 g of ethylhexyl acrylate, 64.8 g of ethylhexyl methacrylate, 64.8 g of styrene, 166.0 g of Solvesso® 100, and 110.4 g of Vazo® 67 were charged to a separate container. This mixture was pumped to the reaction flask over a period of 4 hours. At the conclusion of the first feed, a second addition of 13.8 g of Vazo® 67 and 34.2 g of toluene was fed over 30 minutes. After the second initiator feed, 52 g of toluene and a mixture of 550 g of toluene and 8.4 g of bismuth (III) tri(2-ethylhexanoate) were added to the reaction mixture.

The degree of transcarbamation was monitored by measuring the hydroxyl number of the resin by either wet titration or by its near infrared (NIR) spectrum. The percent (%) conversion was calculated from the following equation: (Initial Hydroxyl Number—Measured Hydroxyl Number)/Initial Hydroxyl Number×100. The reaction was stopped when greater than about 90% conversion was reached or when the reaction stalled and would not proceed any further.

After the desired conversion was reached, the solvent and excess alkyl carbamate were removed under a vacuum. The stripped resin is then reconstituted to a desired percent non-volatile using a solvent, such as a ketone, ester, or aromatic solvent such as toluene or xylene.

Example 2

Carbamate-Functional Acrylic Polymer

A three-necked, 5-liter, round-bottom flask was fitted with an agitator at the center neck and a Claisson adapter at one of the side necks. A thermocouple and a nitrogen purge were fed through the center of the Claisson adapter and a monomer feed line was fed through the side neck of the adapter. The second side neck of the flask was fitted with a column packed with ceramic saddles, a convertible liquid/liquid continuous extractor, and a water-cooled condenser. The liquid/liquid extractor contained 100 g of deionized water to extract the methanol from the methanol/aromatic solvent distillate mixture.

238.5 g of urethane-grade mixed aromatics solvent (Solvesso® 100), 208.9 g of methyl carbamate, and 0.62 of bismuth (III) oxide were charged to the flask. The mixture was agitated and heated to 140° C. with a nitrogen purge. As distillate started to condense to the liquid/liquid extractor, the nitrogen purge was discontinued.

329.4 g of hydroxyethyl methacrylate, 461.5 g of ethylhexyl acrylate, 64.8 g of ethylhexyl methacrylate, 64.8 g of styrene, 166.0 g of Solvesso® 100, and 110.4 g of Vazo® 67 were charged to a separate container. This mixture was pumped to the reaction flask over a period of 4 hours. At the conclusion of the first feed, a second addition of 13.8 g of Vazo® 67 and 34.2 g of toluene was fed over 30 minutes. After the second initiator feed, 52 g of toluene and a mixture of 550 g of toluene and 5.7 g of bismuth (III) oxide were added to the reaction mixture.

The degree of transcarbamation was monitored by measuring the hydroxyl number of the resin by either wet titration or by its near infrared (NIR) spectrum. The percent (%) conversion was calculated from the following equation: (Initial Hydroxyl Number—Measured Hydroxyl Number)/Initial Hydroxyl Number×100. The reaction was stopped when greater than about 90% conversion was reached or when the reaction appeared to stall and would not proceed any further.

After the desired conversion was reached, the solvent and excess alkyl carbamate were removed under a vacuum. The stripped resin is then reconstituted to a desired percent non-volatile using a solvent, such as a ketone, ester, or aromatic solvent such as toluene or xylene.

Example 3
Carbamate-Functional Acrylic Polymer

A three-necked, 5-liter, round-bottom flask was fitted with an agitator at the center neck and a Claisson adapter at one of the side necks. A thermocouple and a nitrogen purge were fed through the center of the Claisson adapter and a monomer feed line was fed through the side neck of the adapter. The second side neck of the flask was fitted with a column packed with ceramic saddles, a convertible liquid/liquid continuous extractor, and a water-cooled condenser. The liquid/liquid extractor contained 100 g of deionized water to extract the methanol from the methanol/aromatic solvent distillate mixture.

238.5 g of urethane-grade mixed aromatics solvent (Solvesso® 100), 208.9 g of methyl carbamate, and 1.0 g of zirconium catalyst (K-Kat XC-6212®, King Industries) were charged to the flask. The mixture was agitated and heated to 140° C. with a nitrogen purge. As distillate started to condense to the liquid/liquid extractor, the nitrogen purge was discontinued.

329.4 g of hydroxyethyl methacrylate, 461.5 g of ethylhexyl acrylate, 64.8 g of ethylhexyl methacrylate, 64.8 g of styrene, 166.0 g of Solvesso® 100, and 110.4 g of Vazo® 67 were charged to a separate container. This mixture was pumped to the reaction flask over a period of 4 hours. At the conclusion of the first feed, 636 g of toluene and 6.0 g of K-Kat XC-6212® were added to the reaction mixture.

The degree of transcarbamation was monitored by measuring the hydroxyl number of the resin by either wet titration or by its near infrared (NIR) spectrum. The percent (%) conversion was calculated from the following equation: (Initial Hydroxyl Number—Measured Hydroxyl Number)/Initial Hydroxyl Number×100. The reaction was stopped when the reaction appeared to stall and would not proceed any further. A 65% conversion was achieved.

After the desired conversion was reached, the solvent and excess alkyl carbamate were removed under a vacuum. The stripped resin is then reconstituted to a desired percent non-volatile using a solvent such as a ketone, ester, or aromatic solvent such as toluene or xylene.

The invention has been described in detail with reference to preferred embodiments thereof. It should be understood, however, that variations and modifications can be made within the spirit and scope of the invention.

What is claimed is:

1. A method of preparing a carbamate-functional polymer comprising the steps of:
   (a) providing a hydroxy-functional polymer; and
   (b) reacting a carbamate compound with said hydroxy-functional polymer in the presence of a transcarbamation catalyst, thereby forming a carbamate-functional polymer, wherein said transcarbamation catalyst is selected from the group consisting of Bi(III) compounds, Zr(IV) compounds, and mixtures thereof.

2. A method according to claim 1, wherein said hydroxy-functional polymer is selected from the group consisting of acrylics, polyesters, and mixtures thereof.

3. A method according to claim 1, wherein said hydroxy-functional polymer is an acrylic polymer.

4. A method according to claim 1, wherein said carbamate compound is an alkyl carbamate, wherein said alkyl group has 1 to 4 carbons.

5. A method according to claim 1, wherein said Bi(III) compound is selected from the group consisting of bismuth (III) oxide, bismuth (III) tri(2-ethylhexanoate), and mixtures thereof.

6. A method according to claim 1, wherein said Bi(III) compound is selected from the group consisting of reaction products of bismuth oxide halides with acid compounds, reaction products of bismuth oxide halides with alcohol compounds, bismuth (III) tri(2-ethylhexanoate), and mixtures thereof.

7. A method according to claim 1, wherein said Zr(IV) compound is selected from the group consisting of zirconium alkoxides, zirconium alkanoates, zirconium dihalide oxides, and mixtures thereof.

8. A method according to claim 1, wherein said Zr(IV) compound is selected from the group consisting of zirconium chelates, zirconium dichloride oxide, zirconium 2-ethylhexanoate, zirconium n-butoxide, zirconium naphthenate, zirconium octoate, and mixtures thereof.

9. A method of preparing carbamate-functional polymers comprising the step of polymerizing in a reaction vessel at a temperature below about 150° C. at least one hydroxy-functional monomer in the presence of a transcarbamation catalyst and an alkyl carbamate compound having 1 to 4 carbons to form an at least partially carbamated polymer, wherein said transcarbamation catalyst is selected from the group consisting of Bi(III) compounds, Zr(IV) compounds, and mixtures thereof.

10. A method according to claim 9 in which a partially carbamated polymer is further reacted with an additional amount of said carbamate compound and said transcarbamation catalyst.

11. A method according to claim 9, wherein said hydroxy-functional monomer, transcarbamation catalyst, and carbamate compound are added substantially simultaneously to said reaction vessel.

12. A method according to claim 9, wherein said transcarbamation catalyst and carbamate compound are added to said reaction vessel first and said hydroxy-functional monomer is added second.

13. A method according to claim 9, wherein said hydroxy-functional polymer is selected from the group consisting of acrylics, polyesters, and mixtures thereof.

14. A method according to claim 9, wherein said hydroxy-functional polymer is an acrylic.

15. A method according to claim 9, wherein said Bi(III) compound is selected from the group consisting of bismuth (III) oxide, bismuth (III) tri(2-ethylhexanoate), and mixtures thereof.

16. A method according to claim 9, wherein said Bi(III) compound is selected from the group consisting of reaction products of bismuth oxide halides with acid compounds, reaction products of bismuth oxide halides with alcohol compounds, bismuth (III) tri(2-ethylhexanoate), and mixtures thereof.

17. A method according to claim 9, wherein said Zr(IV) compound is selected from the group consisting of zirconium alkoxides, zirconium alkanoates, zirconium dihalide oxides, and mixtures thereof.

18. A method according to claim 9, wherein said Zr(IV) compound is selected from the group consisting of zirconium chelates, zirconium dichloride oxide, zirconium 2-ethylhexanoate, zirconium n-butoxide, zirconium naphthenate, zirconium octoate, and mixtures thereof.

19. A method of preparing carbamate-functional acrylic polymers comprising the step of polymerizing in a reaction vessel at a temperature below about 150° C. at least one hydroxy-functional monomer in the presence of a transcarbamation catalyst and an alkyl carbamate compound having 1 to 4 carbons to form an at least partially carbamated polymer, wherein said transcarbamation catalyst is selected from the group consisting of Bi(III) compounds, Zr(IV) compounds, and mixtures thereof.

20. A method according to claim 19, in which a partially carbamated polymer is further reacted with an additional portion of said carbamate compound and said transcarbamation catalyst.

21. A method of preparing a carbamate-functional polymer, comprising the steps of:
   (a) preparing a polymer using at least one monomer having hydroxyl functionality;
   (b) reacting a carbamate compound with said hydroxyl functionality in the presence of a compound selected from the group consisting of Bi(III) compounds, Zr(IV) compounds, and mixtures thereof:
      wherein step (b) is carried out during step (a), after step (a), or both during and after step (a).

* * * * *